United States Patent
Saitou

(10) Patent No.: US 10,902,482 B2
(45) Date of Patent: Jan. 26, 2021

(54) SERVER APPARATUS

(71) Applicant: TOSHIBA TEC KABUSHIKI KAISHA, Tokyo (JP)

(72) Inventor: Takahiro Saitou, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 266 days.

(21) Appl. No.: 16/034,874

(22) Filed: Jul. 13, 2018

(65) Prior Publication Data
US 2019/0026794 A1     Jan. 24, 2019

(30) Foreign Application Priority Data
Jul. 19, 2017 (JP) ................. 2017-140332

(51) Int. Cl.
| | | |
|---|---|---|
| G06Q 30/02 | (2012.01) | |
| G06Q 10/00 | (2012.01) | |
| G06Q 10/02 | (2012.01) | |
| G06K 9/00 | (2006.01) | |
| G06K 9/78 | (2006.01) | |
| G06Q 50/12 | (2012.01) | |

(52) U.S. Cl.
CPC ..... *G06Q 30/0281* (2013.01); *G06K 9/00288* (2013.01); *G06K 9/78* (2013.01); *G06Q 10/00* (2013.01); *G06Q 10/02* (2013.01); *G06Q 50/12* (2013.01)

(58) Field of Classification Search
None
See application file for complete search history.

(56) References Cited

U.S. PATENT DOCUMENTS

| | | | |
|---|---|---|---|
| 6,980,088 B2 * | 12/2005 | Stambaugh | E04H 3/04 340/286.09 |
| 2004/0158494 A1 * | 8/2004 | Suthar | G06Q 30/06 705/15 |
| 2010/0111377 A1 * | 5/2010 | Monroe | G08B 13/1965 382/118 |
| 2011/0136516 A1 * | 6/2011 | Ellis | H04W 4/14 455/458 |
| 2013/0090959 A1 | 4/2013 | Kvamme et al. | |
| 2015/0371317 A1 | 12/2015 | Bosko et al. | |

FOREIGN PATENT DOCUMENTS

JP     4358658 B     9/2005

OTHER PUBLICATIONS

Search Report dated Sep. 26, 2018, received in corresponding European application No. 18 18 4156.0, 7 pages.

\* cited by examiner

*Primary Examiner* — Paul Danneman
(74) *Attorney, Agent, or Firm* — Foley & Lardner LLP

(57) ABSTRACT

A server apparatus allows wait-listed customers to register information for the purposes of line placement and subsequent verification upon return. A customer can register a face image and contact information with a registration module of the server apparatus. When the next customer is called, a paging module of the server apparatus notifies the customer. An identification module of the server apparatus can take a second image of the person who responded to the call for comparison with the original image. Based on the result obtained from the identification module, a determination module of the server apparatus can verify the identity of the responding person. The server apparatus then provides table guide information to the verified customer.

20 Claims, 14 Drawing Sheets

SERVER APPARATUS

CROSS-REFERENCE TO RELATED APPLICATION

This application claims the benefit of and priority to Japanese Patent Application No. 2017-140332, filed on Jul. 19, 2017, the entire contents of which are incorporated herein by reference.

FIELD

Embodiments described herein relate generally to a server apparatus.

BACKGROUND

A restaurant uses a customer management system to register waiting customers. A customer would register his or her name and provide a number of accompanying persons in a waiting list in the management system. In such a customer management system (waiting sheet system), an employee of the restaurant checks whether a table becomes available. When a table becomes available, the employee pages the next waiting customer according to the registration list and brings the customer to the now available table.

In the system described above, it is possible for a person other than the next listed customer to pretend to be the next listed customer (e.g., when the actual listed customer temporarily leaves a waiting location). This is because that the information provided in the waiting list alone is insufficient in verifying the identity of the next customer in line.

DESCRIPTION OP THE DRAWINGS

DETAILED DESCRIPTION

A server apparatus according to an embodiment includes a registration module, a paging module, an identification module, and a determination module. The registration module registers information including a first information for identifying a customer who waits for his or her turn. The paging module performs notification for paging the customer based on the information registered with the registration module if the waiting order of the customer comes. The identification module confirms a relationship between the first information and a second information, relating to the first information, that a person who responds to the paging by the paging module has. Then, based on a result of the confirmation by the identification module, the determination module determines whether or not the person who responds to the paging is really the customer who has to be paged.

Description of In-Store Guide System

Figure 1:
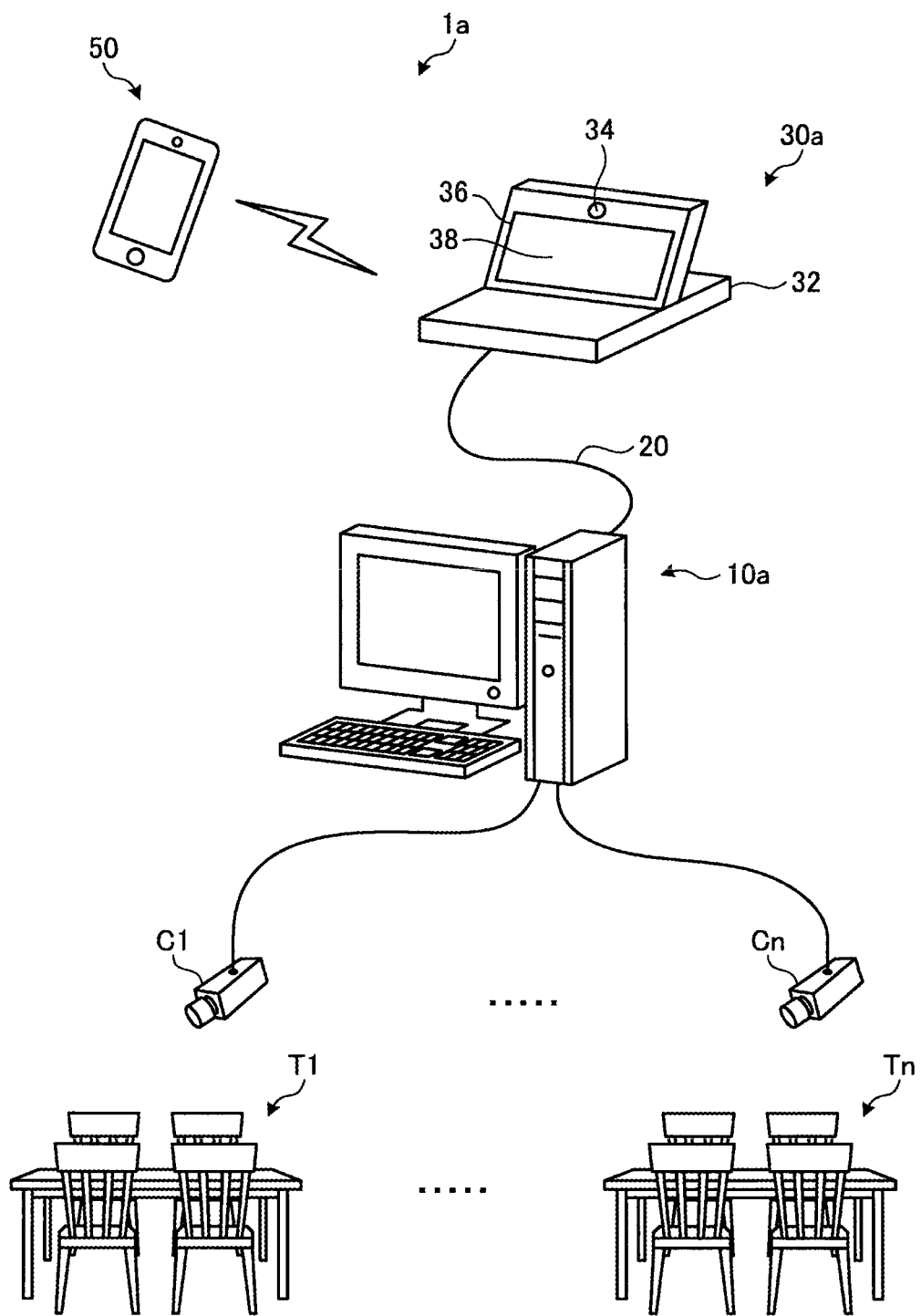
FIG. 1 is an external-view illustrating a schematic arrangement of an example of an in-store guide system.

An in-store guide system according to the present embodiment is described with reference to the accompanying drawings. FIG. 1 is an external-view illustrating a schematic arrangement of an in-store guide system. It is noted that an embodiment described below is given as an example in which a server apparatus is applied to an in-store, guide system in which a customer who comes to a restaurant is guided to a table if the table is prepared. An in-store guide system 1a includes a store server 10a, a guide apparatus 30a, and a portable terminal 50.

The store server 10a is installed in a store to control all operations by the in-store guide system 1a. The store server 10a is an example of the server apparatus.

A plurality of cameras C1 to Cn are connected to the store server 10a. The cameras C1 to Cn are installed on a ceiling of the store to capture an image around tables T1 to Tn installed in a place where food is served, from the above.

The guide apparatus 30a is a terminal apparatus that performs operations, such as a registering of information on a customer who comes to the store, a paging of a customer whose waiting turn comes, an identifying whether or not a person who responds to the paging is a proper person (customer) who has to be paged, and a presentation of a path to a table to which the customer is guided.

The guide apparatus 30a includes an LCD (Liquid Crystal Display) 36, a touch panel 38 positioned on the front surface of the LCD 36, and a camera 34, on a casing 32 thereof. For the customer, the LCD 36 displays an operation instruction, a guidance information, and the like. By operating the touch panel 38, the customer inputs a registration information, such as the number of persons accompanied by the customer, and a contact information to the in-store guide system 1a. The camera 34 is set in the same direction as a display surface of the LCD 36 to capture an image of the face of the customer who faces the guide apparatus 30a. The guide apparatus 30a and the store server 10a are connected to each other through a network 20. The network 20 is, for example, an in-store LAN (Local Area Network) by a wireless or wired connection.

The portable terminal 50 is, for example, a smartphone, a tablet terminal or a portable telephone, that a customer carries. The portable terminal 50 receives a message transmitted from the guide apparatus 30a to display the received message on a screen thereof. It is noted that the portable terminal 50 is an example of information processing apparatus.

Description of Hardware Constitution of Store Server

Figure 2:
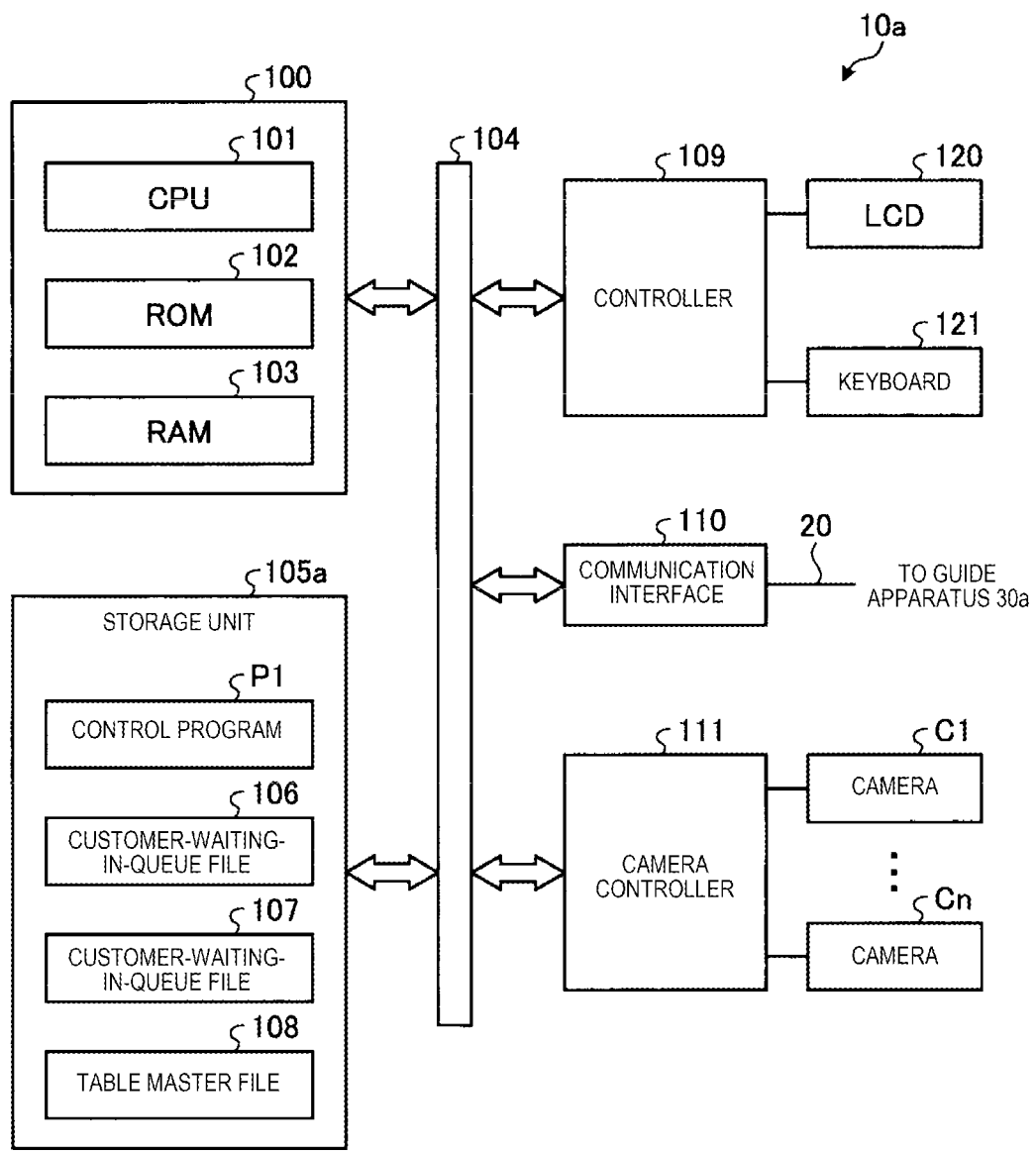
FIG. 2 is a block diagram illustrating an example of a hardware constitution of a store server.

FIG. 2 is a block diagram illustrating an example of a hardware constitution of the store server 10a. The store server 10a includes a control unit 100 for controlling each unit thereof. The control unit 100 includes a CPU (Central Processing Unit) 101, a ROM (Read Only Memory) 102, and a RAM (Random Access Memory) 103. The CPU 101 is connected to the ROM 102 and the RAM 103 through a bus line 104 such as an address bus and a data bus. The CPU 101 loads or copies various programs or various data stored in the ROM 102 or a storage unit 105a on the RAM 103. The CPU 101 operates according to various programs loaded on the RAM 103 to control the store server 10a. The control unit 100 has a function of a general-purpose computer.

The control unit 100 is connected to the storage unit 105a, a controller 109, a communication interface 110 and a camera controller 111 through a bus line 104.

The storage unit 105a is a storage device such as a HDD (Hard Disk Drive) or a SSD (Solid State Drive). The storage unit 105a is a non-volatile memory such as a flash memory of which stored contents are retained even if power is cut off. The storage unit 105a stores programs including a control program P1. The control program P1 realizes functions of the store server 10a if it is executed. Furthermore, the storage unit 105a stores a customer-waiting-order file 106, a customer face file 107, and a table master file 108.

The customer-waiting-order file 106 stores information on customers who wait for their turns. Specifically, the customer-waiting-order file 106 stores a waiting order, a customer name, the number of persons accompanied by the customer (or the number of group members) and contact information (for example, a mail address of the portable terminal 50) that is necessary when paging the customer. Additionally, the number of adults, the number of children, a preference for a smoking seat or a no-smoking seat, and the like may be stored in the customer-waiting-order file 106.

The customer face file 107 stores images of the faces of customers who wait for their turns. It is noted that an image of the face of the customer is captured by the camera 34 (refer to FIG. 1).

The table master file 103 stores positions of tables T1 to Tn (refer to FIG. 1) arranged in the store and the number of persons that can be seated. Furthermore, the table master file 108 stores an image of each table (first image), captured in advance, at the time the table becomes a state in which a customer can be guided.

The controller 109 is connected to a liquid display device (hereinafter referred to as an LCD) 120 and a keyboard 121. The LCD 120 displays screens on which states of the store server 10a are displayed. With the keyboard 121, an operation instruction for the store server 10a is input. The controller 109 controls various hardware connected thereto according to the instruction from the control unit 100.

The communication interface 110 communicates with the guide apparatus 30a through the network 20 (refer to FIG. 1) such as the LAN within the store.

The cameras C1 to Cn are connected to the camera controller 111. The cameras C1 to Cn, as described above, respectively captures images of the tables T1 to Tn from the above. The camera controller 111 controls an image capturing operation of each of the cameras C1 to Cn under the control of the control unit 100, It is noted that the cameras C1 to Cn are examples of an image capturing module.

Description of Hardware Constitution of Guide Apparatus

Figure 3:
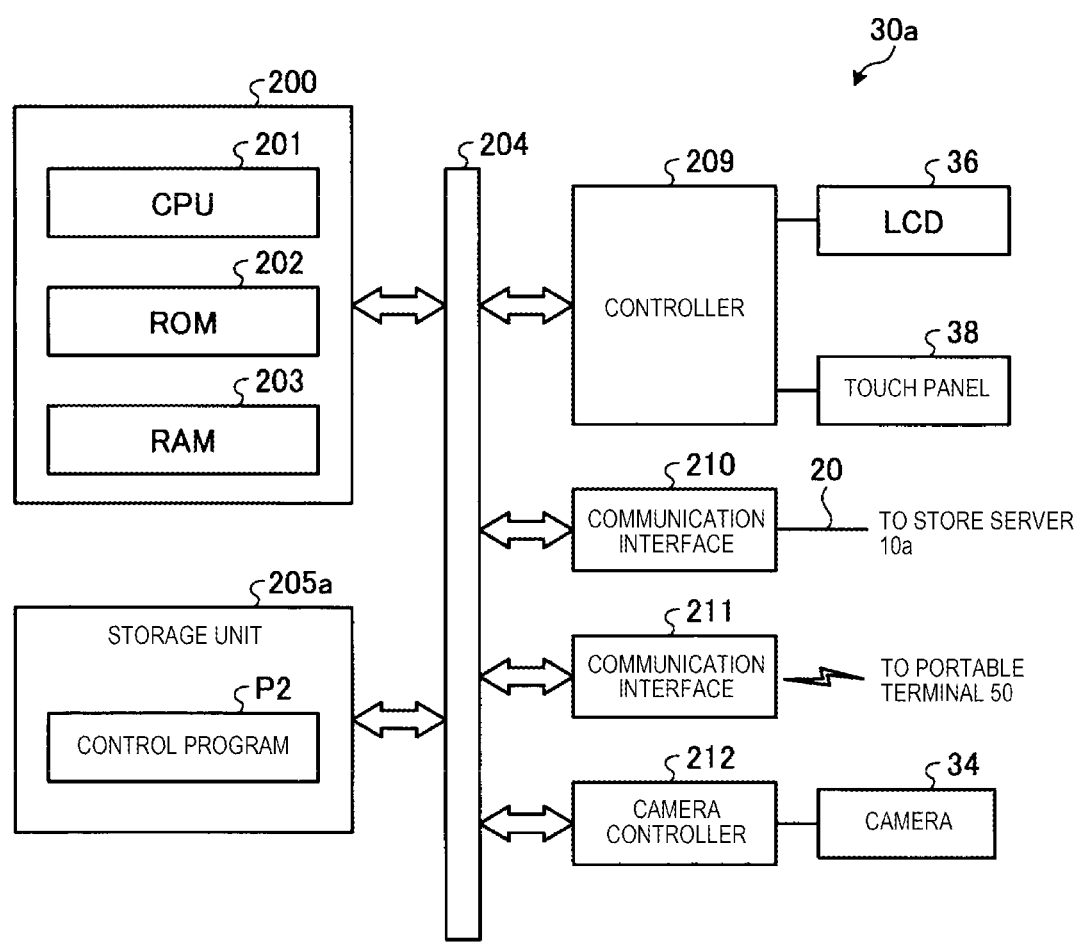
FIG. 3 is a block diagram illustrating an example of a hardware constitution of a guide apparatus.

FIG. 3 is a block diagram illustrating an example of a hardware constitution of the guide apparatus 30a. The guide apparatus 30a includes a control unit 200 for controlling each unit thereof. The control unit 200 includes a CPU (Central Processing Unit) 201, a ROM (Read Only Memory) 202, and a RAM (Random Access Memory) 203. The CPU 201 is connected to the ROM 202 and the RAM 203 through a bus line 204 including an address bus and a data bus. The CPU 201 loads or copies various programs stored in the ROM 202 or a storage unit 205a, on the RAM 203. The CPU 201 executes various programs loaded on the RAM 203 to control the store server 30a. The control unit 200 realizes a function of a general-purpose computer.

The control unit 200 is connected to the storage unit 205a, a controller 203, communication interfaces 210 and 211, and a camera controller 212 through the bus line 204.

The storage unit 205a is an HDD (Hard Disk Drive) or an SSD (Solid State Drive). The storage unit 205a may be a non-volatile memory, such as a flash memory, the stored contents of which is retained even if power is turned off. The storage unit 205a stores programs including a control program P2.

The controller 209 is connected to the LCD 36 and the touch panel 38. The controller 203 controls various hardware connected thereto according to the instruction from the control unit 200.

The communication interface 210 communicates with the store server 10a through the network 20 (refer to FIG. 1) such as the LAN in the store.

The communicating interface 211 communicates with the portable terminal 50 through a wireless LAN or the like.

The camera controller 212 is connected to the camera 34. The camera controller 212 controls an image capturing operation of the camera 34 under the control of the control unit 200.

Description of Hardware Constitution of Portable Terminal

The portable terminal 50 that a customer carries has a function of a general-purpose computer. The portable terminal 50 executes a control program stored in an internal memory thereof to realize a prescribed function. It is noted that the portable terminal 50 utilized in the in-store guide system 1a has a well-known function of receiving a message (for example, an electronic mail) transmitted by the guide apparatus 30a and displaying the content of the message on a screen and thus the illustration of the hardware block and the detailed description thereof are omitted.

Description of Functional Constitution of In-Store Guide System

Figure 4:
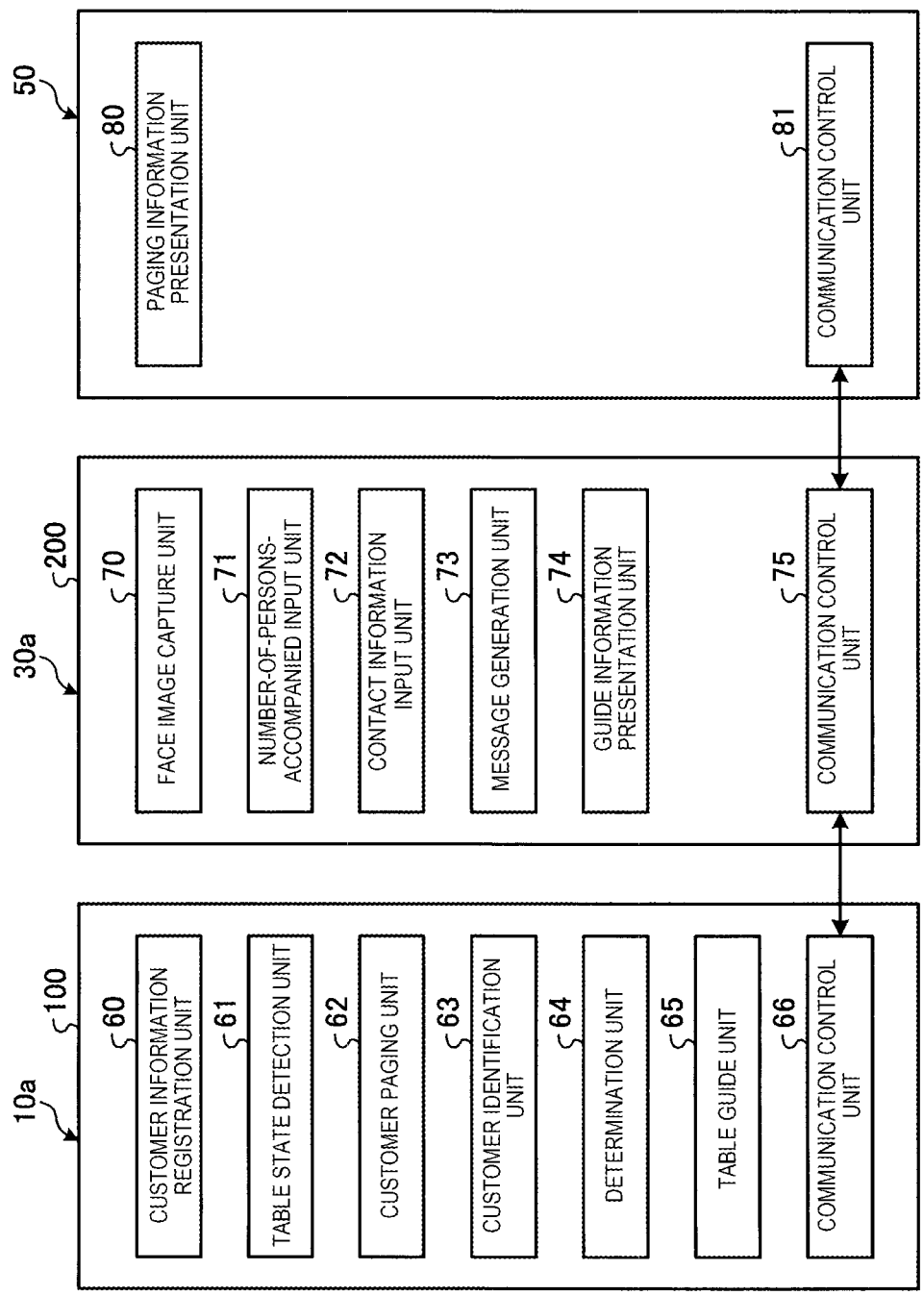
FIG. 4 is a block diagram illustrating an example of a functional constitution of the in-store guide system.

FIG. 4 is a block diagram illustrating an example of the functional constitution of the in-store guide system 1a. The control unit 100 of the store server 10a loads or copies the control program P1 (refer to FIG. 2) on the RAM 103 to execute the control program P1. Thus, the control unit 100 realizes each functional unit illustrated in FIG. 4. The control unit 100 operates as a customer information registration unit 60, a table state detection unit 61, a customer paging unit 62, a customer identification unit 63, a determination unit 64, a table guide unit 65, and a communication control unit 66.

The customer information registration unit 60 registers information including a face image of the customer for identifying the customer who waits for his or her turn. Furthermore, in addition to the face image of the customer, the customer information registration unit 60 registers information, such as the number of persons accompanied by the customer and the contact information, collectively. It is noted that the customer information registration unit 60 is an example of a registration unit. Furthermore, the face image of the customer is an example of a first information for identifying the customer who waits for his or her turn. It is also noted that an image of the face of the customer to be registered by the customer information registration unit 60, is captured with the camera 34 included in the guide apparatus 30a, and that the captured face image is registered as information. Further, information for retention is input by operating the touch panel 38 included in the guide apparatus 30a by the customer.

The table state detection unit 61 performs a table state determination processing for detecting a table in a state in which a customer who waits for his or her turn and persons accompanied by the customer can be guided thereto. It is noted that the table state detection unit 61 is an example of a detection module and a table state detection module.

The customer paging unit 62 instructs the guide apparatus 30a to perform notification for paging a customer who waits for his or her turn, based on the information registered with the customer information registration unit 60 if the table state detection unit 61 detects the table with the state described above. Specifically, the customer paging unit 62 instructs the guide apparatus 30a to page the customer based on the contact information of the customer registered by the customer information registration unit 60. It is noted that the customer paging unit 62 is an example of a paging module.

The customer identification unit 63 acquires a face image of a person who responds to the paging, as a second information to confirm whether or not the acquired face image (second information) is the same as chat (first information) registered by the customer information registration unit 60. It is noted that the customer identification unit 63 is an example of an identification module. Furthermore, the face image of the person acquired by the customer identification unit 63 is an example of the second information. However, according to the present embodiment, the first information and the second information are respectively defined as the face image.

Based on the confirmation result by the customer identification unit 63, the determination unit 64 determines whether or not the person who responds to the paging is the customer who has to be paged. It is noted that the determination unit 64 is an example of a determination module.

The table guide unit 65 instructs the guide apparatus 30a to indicate a guide information (for example, path to the table) to the person who responds to the paging.

The communication control unit 66 performs communication between the store server 10a and the guide apparatus 30a.

The control unit 200 of the guide apparatus 30a loads or copies the control program P2 (refer to FIG. 3) on the RAM 203 to execute the control program P2. Thus, the control unit 200 realizes each functional unit illustrated in FIG. 4. The control unit 200 operates as a face image capture unit 70, a number-of-accompanying-persons input unit 71, a contact information input unit 72, a message generation unit 73, a guide information presentation unit 74, and a communication control unit 75.

The face image capture unit 70 captures the face image of a customer who waits for his or her turn and the face image of a person who responds to the paging, using the camera 34 (refer to FIG. 1). Furthermore, the face image capture unit 70 detects a characteristic of the face in the captured image. It is noted that the detected characteristic is a color of a face area, a shape of a face, a distance between both eyes, a shape of a lip, a relationship among both eyes, a nose, and a lip which are utilized in the well-known face recognition technology.

The customer who waits for his or her turn inputs the number of persons accompanied by the customer (or the total number of persons including the customer) to the number-of-accompanying-persons input unit 71. It is noted that the customer may perform input of a name of the customer, the number of adults, the number of children, and the like, as well as the input of the number of persons accompanied by the customer on the number-of-accompanying-persons input unit 71. Additionally, selection of a smoking seat or a no-smoking seat may be performed on the number-of-accompanying-persons input unit 71. The number of persons accompanied by the customer is input by operating the touch panel 38 (refer to FIG. 3).

The customer who waits for his or her turn inputs, for example, the mail address of the portable terminal 50, as the contact information, to the contact information input unit 72. The mail address is input by operating the touch panel 38.

The message generation unit 73 generates a message delivered to the customer who waits for his or her turn if his or her turn comes. It is noted that the message generation unit 73 may create a new message each time the message is generated or may read out a fixed message prepared in advance.

The guide information presentation unit 74 displays a path to a table to which the customer is guided, on the LCD 36.

The communication control unit 75 performs communication between the guide apparatus 30a and the store server 10a. Furthermore, the communication control unit 75 performs communication between the guide apparatus 30a and the portable terminal 50.

The portable terminal 50 executes the control program stored in the portable-terminal 50 not illustrated to realize each function unit illustrated in FIG. 4. The portable terminal 50 operates as a paging information presentation unit 80 and a communication control unit 81.

The paging information presentation unit 80 displays the message transmitted from the guide apparatus 30a on a screen of the portable terminal 50 of the customer if it is called by the guide apparatus 30a which performs paging.

The communication control unit 81 performs communication between the portable terminal 50 and the guide apparatus 30a.

Description of Flow for Registration Processing

Figure 5:
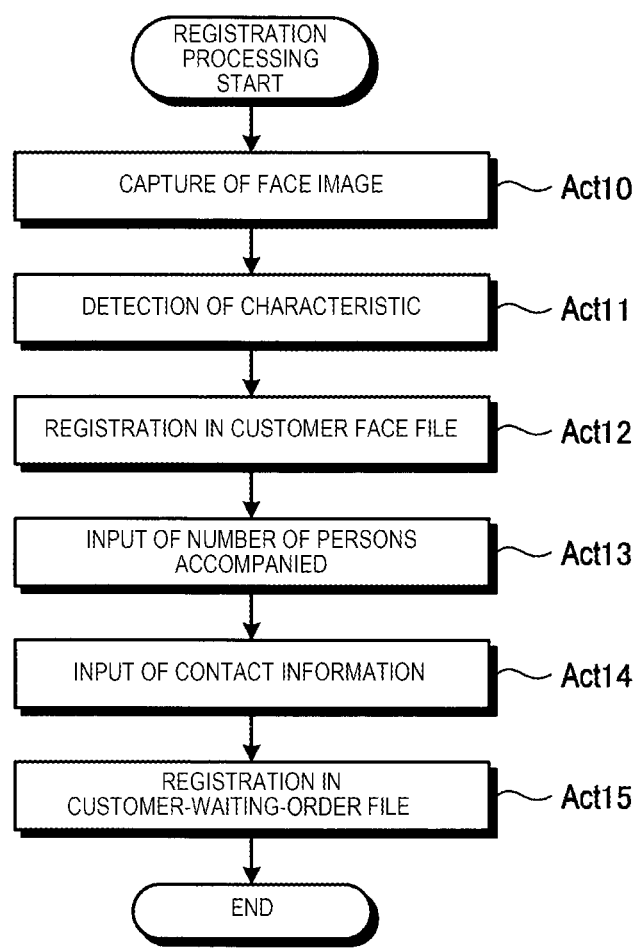
FIG. 5 is a flowchart illustrating an example of a processing for registering a customer who waits for his or her turn.

FIG. 5 is a flowchart illustrating an example of the flow of a processing for registering the customer who waits for his or her turn performed by the store server 10a according to the present embodiment.

The customer information registration unit 60 instructs the face image capture unit 70 to capture the face image of the customer (Act 10).

The face image capture unit 70 detects the characteristic of the face of the customer in the captured face image (Act 11). It is noted that, the characteristic of the face image is not limited to one characteristic, and a plurality of characteristics may be detected.

The customer information registration unit 60 registers the characteristic of the face image detected in Act 11, in the customer face file 107 (Act 12).

The number of persons accompanied by the customer is input to the customer information registration unit 60 through the number-of-accompanying-persons input unit 71 (Act 13).

The contact information (for example, the mail address of the portable terminal 50) to which the message is transmitted is input to the customer information registration unit 60 through the contact information input unit 72 if the turn for paging the customer who waits for his or her turn comes (Act 14).

The customer information registration unit 60 registers the number of persons accompanied by the customer and the contact information in the customer-waiting-order file 106 (Act 15). Thereafter, the registration processing is ended.

Description of Flow of Confirmation Processing

Figure 6:
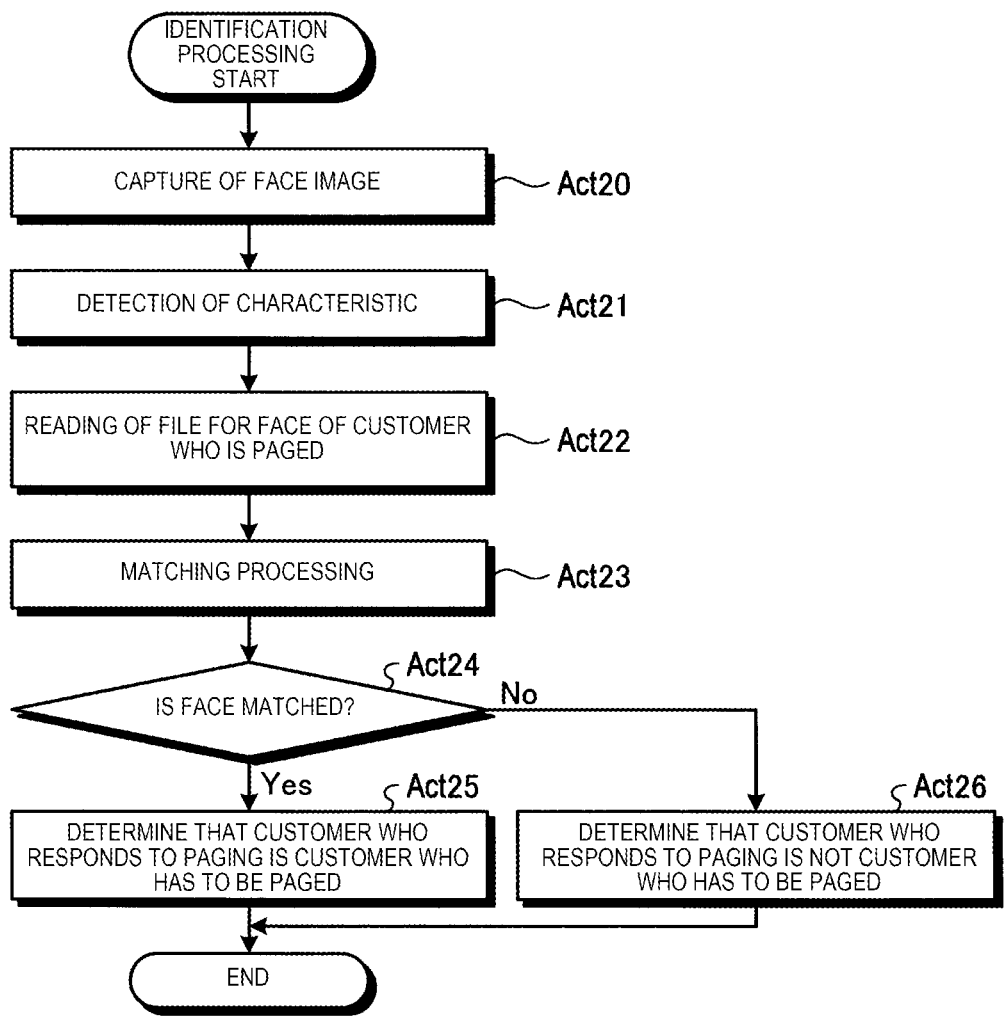
FIG. 6 is a flowchart illustrating an example of a processing for confirming a customer who answers to paging.

FIG. 6 is a flowchart illustrating an example of the flow of the confirmation processing, which is performed by the store server 10a according to the present embodiment, for identifying whether or not the person who responds to the paging is actually the customer who has to be paged.

The customer identification unit 63 instructs the face image capture unit 70 to capture the face image of the person who responds to the paging (Act 20).

The face image capture unit 70 detects a factor for characterizing the face of the customer in the captured face image thereof (Act 21). The factor, i.e., characteristic detected at this time, is the same as the characteristic (refer to Act 11 in FIG. 5) detected by the customer information registration unit 60 at the time the face of the customer is registered.

The customer identification unit 63 reads out the characteristic of the face image of the person who responds to the paging, from the customer face file 107 (Act 22).

The customer identification unit 63 performs a matching processing in which the degree of consistency or similarity between the characteristic detected in Act 21 and the characteristic read out in Act 22 is calculated (Act 23). It is noted that the matching processing is a well-known processing at the time the face recognition is performed. In the matching processing, the characteristics of the face image in the first information and the same characteristics of the face image in the second information as in the first information are compared.

Based on a result of the matching processing, the determination unit 64 determines whether or not the face image of the customer who is registered is consistent with that of the person who is paged (Act 24). Generally, a total of the values in difference between the same characteristics is calculated and it is determined that two face images are consistent with each other if the calculated total value is smaller than a predetermined threshold. In other words, the smaller the total of the values in difference is, the higher the degree of the consistency becomes.

If it is determined that the face of the customer who is registered is consistent with the face of the person who is paged (Yes in Act 24), the determination unit 64 determines that the person who responds to the paging is the customer who waits for his or her turn (Act 25). Thereafter, the identification processing is ended.

On the other hand, if it is determined that the face of the customer who is registered is inconsistent with the face of the person who is paged (No in Act 24), the determination unit 64 determines that the person who responds to the paging is not the customer who waits for his or her turn (Act 26). Thereafter, the identification processing is ended.

Description of Table State Determination Processing

Figure 7A:
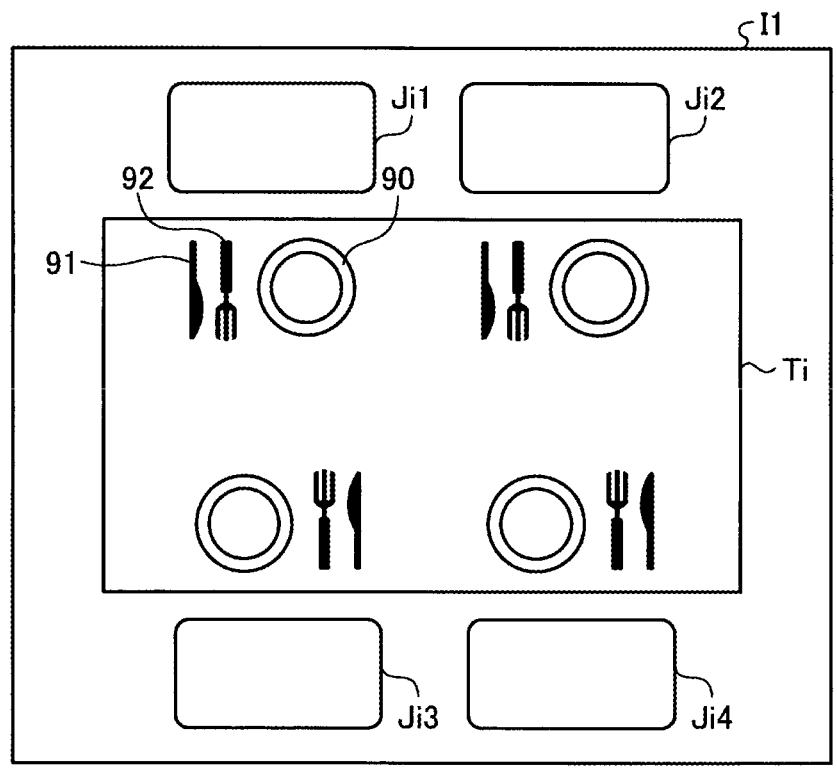
FIGS. 7A and 7B are diagrams illustrating an example of a table state determination processing performed by a table state determination unit.
Figure 7B:
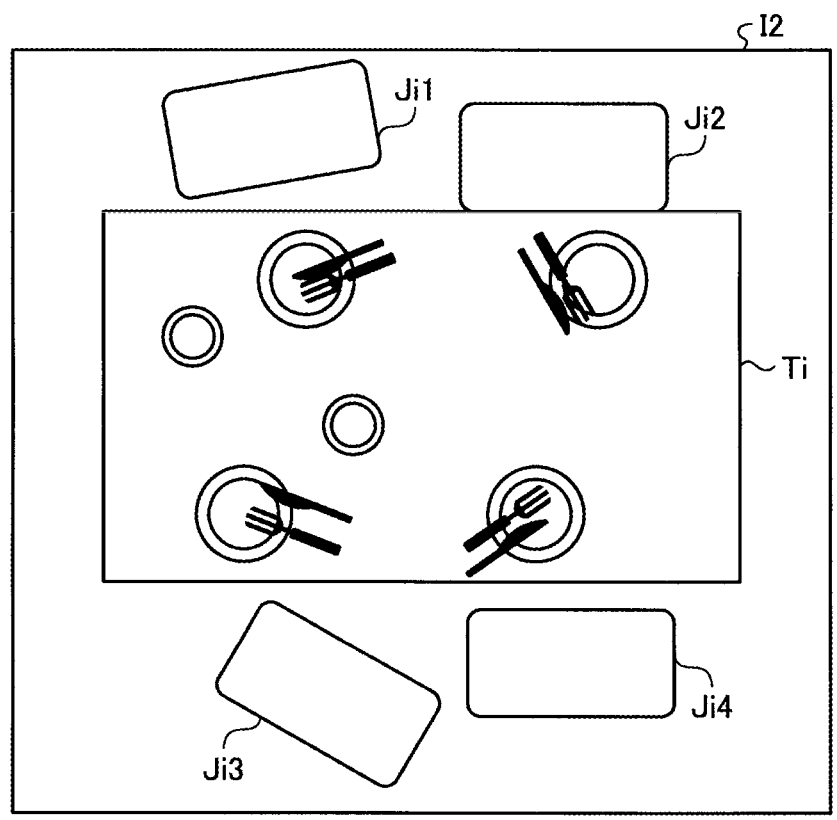

FIGS. 7A and 7B are diagrams illustrating a table state determination processing performed by the table state detection unit 61.

In order to detect a table Ti (i=1 to n) to which the customer who waits for his or her turn and the persons accompanied by the customer can be guided, the table state detection unit Si compares a current image I2 (second image) of the table Ti and a reference image I1 (first image) showing state of the table Ti to which a customer can be guided thereto. Then, if the first image and the second image are similar to each other (similarity degree between the two images is smaller than a prescribed value), the table state detection unit 61 determines that the table TI is in a state in which a customer can be guided thereto. In the present embodiment, the reference image I1 showing that at customer can be guided to the table Ti is captured in advance, and is stored, for example, in the table master file 108 (refer to FIG. 2).

Specifically, if the table Ti is in the state in which a customer can be guided chairs Ji1, Ji2, Ji3, and Ji4 are arranged in a state, as illustrated in FIG. 7A, in which they are orderly set around the table Ti as being originally set. In addition, a set of dish 90, knife 91, and fork 92 (four sets in FIG. 7) is arranged at its regular position.

On the other hand, if the table Ti is in the state in which a customer cannot be guided thereto, that is, in the state in which a customer still has a meal at the table or the table is being cleaned up, chairs Ji1, Ji2, Ji3, and Ji4 are in a state, as illustrated in FIG. 7B, in which they are disorderly left around the table Ti. In addition, a dish 90, a knife 91, and a fork 92 (four sets in FIG. 7) are respectively left on the table Ti in a state in which they are used at meals.

The table state detection unit 61 calculates a distance between the reference image I1 and the current image I2. At this point, the distance between the two images is defined as a value resulting from accumulating a value in difference between values (pixel values) stored in pixels that are positioned at the same coordinate position, over an entire image. That is, if the reference image I1 and the current image I2 are completely consistent with each other, the distance between the two images is 0. On the other hand, if the reference image I1 and the current difference between the reference image I1 and the current image I2 is, the greater the value of the calculated distance becomes.

The table state detection unit 61 stores in advance a threshold of a distance between two images for determining that the reference image I1 and the current image I2 are images in the same, state. Then, if the calculated distance between the reference image I1 and the current image I2 is smaller than the threshold, the table state detection unit 61 determines that the table Ti is in the state in which a customer can be guided thereto. On the other hand, if the distance between the reference image I1 and the current image I2 exceeds the threshold, the table state detection unit 61 determines that the table Ti is in the state in which a customer cannot be guided. The threshold used for the determination is set to be a suitable value that is obtained by performing an experiment in advance. It is noted that, in general, a size, a shape, and the like of each table Ti (i=1 to n) are different from one table Ti to another, and thus the threshold may be set to be a value corresponding to the difference in tables.

Furthermore, the table state detection unit 61 narrows down the number of tables according to the number of persons accompanied by the next customer who waits for his or her turn. If the number of persons accompanied by the next customer who waits for his or her turn is 5 (group in six people), the table Ti for six or more people is selected and then a table state of the selected table Ti is detected. The number of people that have meals at each table Ti is stored in the table master file 108 (refer to FIG. 2), and thus the number of tables of which states are to be detected can be narrowed down according to the number of accompanying persons (or the number of people in a group) registered in the customer-waiting-order file 106.

Description of Flow for Table State Determination Processing

FIG. 3 is a flowchart illustrating an example of the flow of the table state determination processing performed by the store server 10a according to the present embodiment.

The table state detection unit 61 reads out the reference image I1 (first image) of the table Ti from the table master file 108 (Act 30). As described above, the table state detection unit 61 selects the table Ti according to the number of persons accompanied by the customer (number of people in a group) who waits for his or her turn and performs the processing in Act 30.

The table state detection unit 61 captures the current image I2 (second image) of the table Ti (Act 31).

Next, the table state detection unit 61 calculates the distance described above between the reference image I1 and the current image I2 (Act 32).

Figure 8:
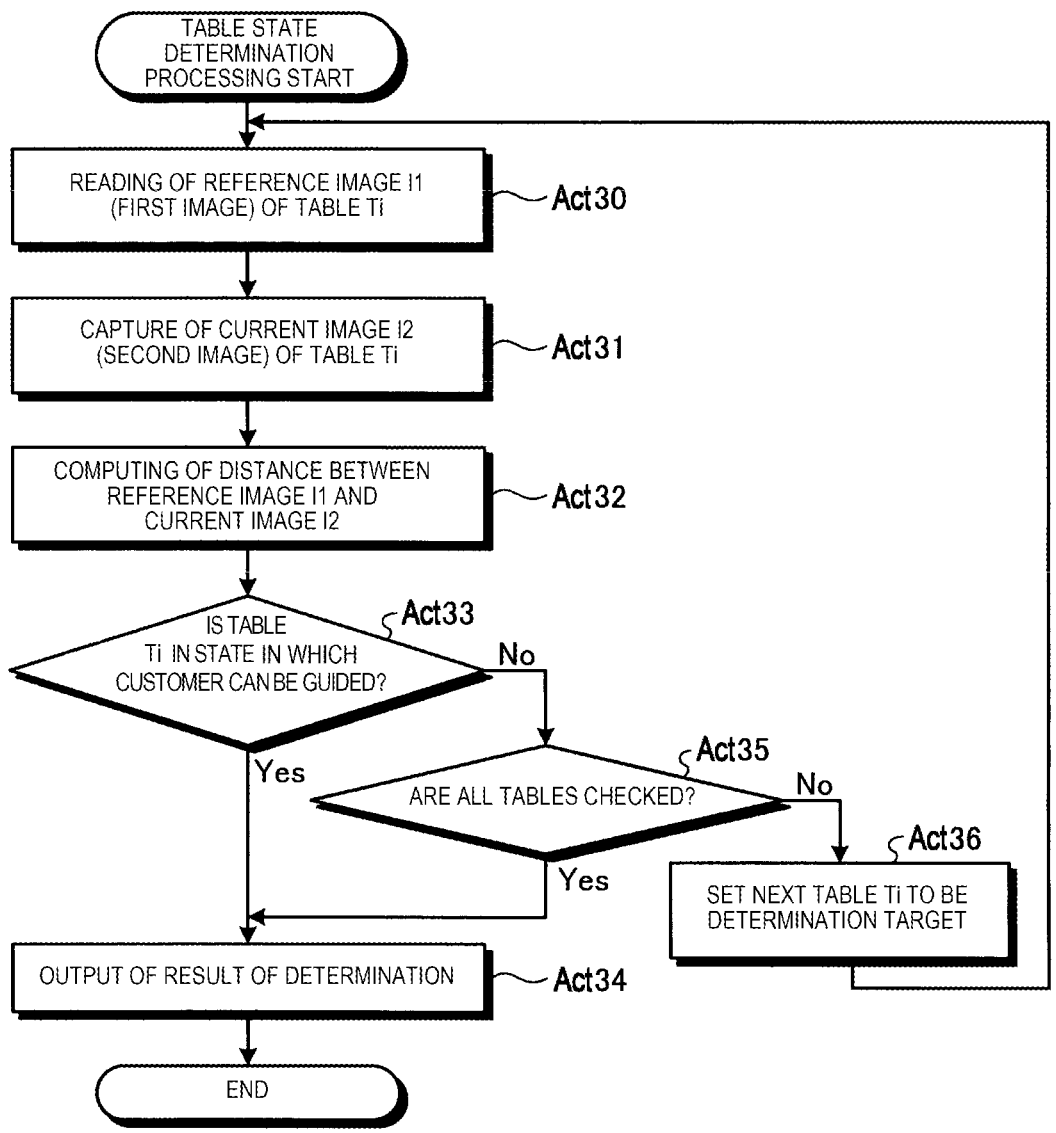
FIG. 8 is a flowchart illustrating an example of the table state determination processing.

Subsequently, the table state detection unit 61 determines whether or not the table Ti is in the state in which the customer can be guided thereto (Act 33). If it is determined that the table Ti is in the state in which the customer can be guided thereto (Yes in Act 33), as a result of the determination a message that the table Ti is in the state in which the customer can be guided thereto is output to the customer paging unit 62 (refer to FIG. 4) (Act 34). Thereafter, the table state detection unit 61 ends the processing in FIG. 8.

On the other hand, in Act 33, if it is determined that the table Ti is in the state in which the customer cannot be guided thereto (No in Act 33), the table state detection unit 61 determines whether or not all tables are checked (Act 35).

In Act 35, if it is determined that all tables are checked (Yes in Act 35), a result of the determination, a message that the table Ti to which the customer is to be guided is not yet available is output to the customer paging unit 62 (Act 34). On the other hand, if it is determined that some of the tables that are to be checked remain (No in Act 35), with reference to the table master file 108, the remaining tables Ti are set to be a target for the table state determination processing (Act 36). Thereafter, the processing in Act 30 described above is re-executed.

Description of Flow for Processing Performed by In-Store Guide System

Figure 9:
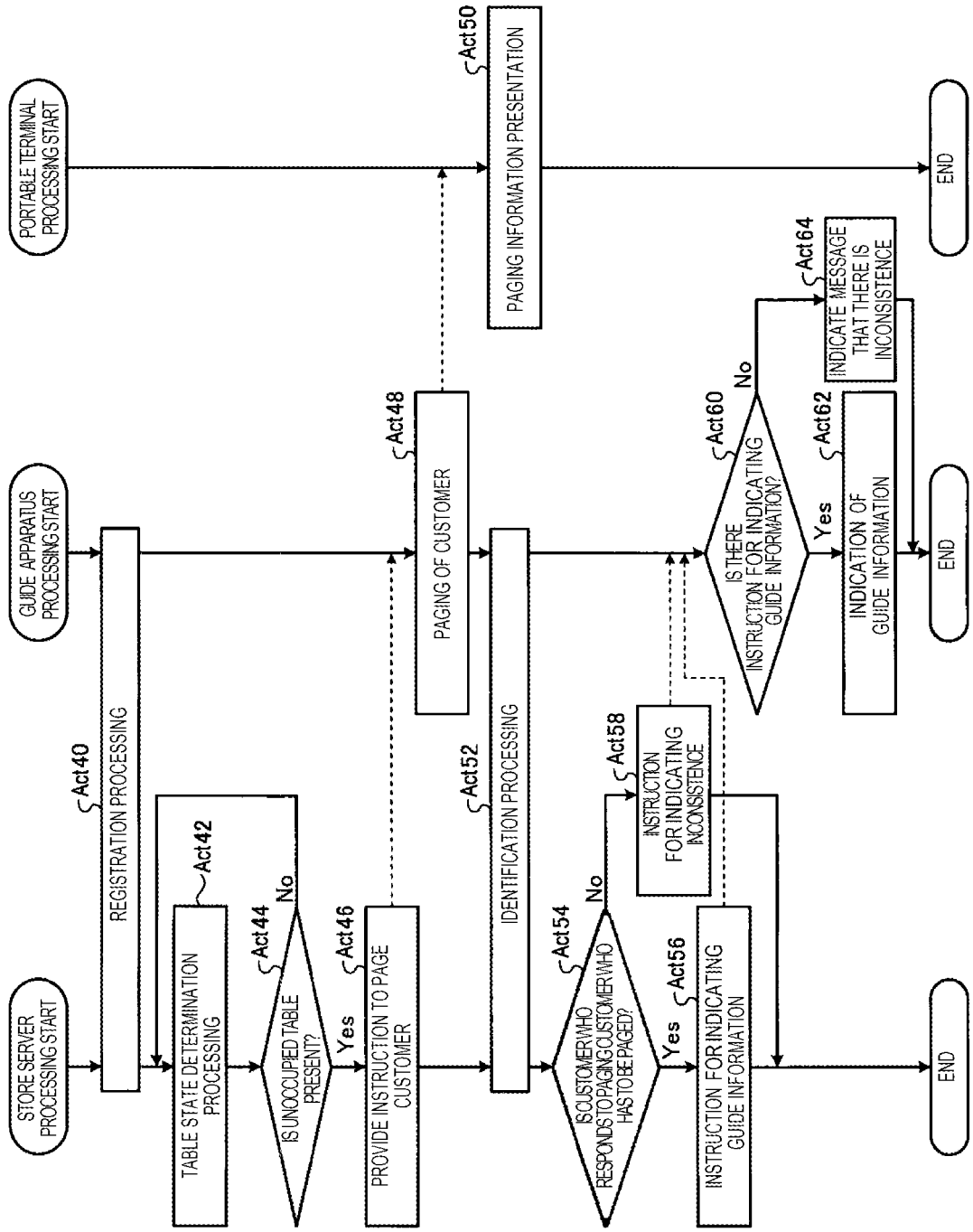
FIG. 9 is a flowchart illustrating an example of a processing performed by the in-store guide system.

FIG. 9 is a flowchart illustrating an example of the flow of the processing performed by the in-store guide system 1a.

The store server 10a, the guide apparatus 30a, and the portable terminal 50 cooperate with each other, and thus the in-store guide system 1a operates. First, a processing performed by the guide apparatus 30a is described with reference to FIG. 3.

If all the tables are occupied, the guide apparatus 30a executes the registration processing for performing a waiting order registration for a customer who comes to the store in cooperation with the store server 10a (Act 40). Details of the registration processing are already described above (refer to FIG. 5).

The message generation unit 73 of the guide apparatus 30a receives an instruction for paging the customer from the store server 10a (Act 46), and transmits a paging message to the portable terminal 50 of the customer (Act 48).

Next, the guide apparatus 30a performs the identification processing for identifying whether or not the customer is actually the customer who has to be paged, to the person who responds to the paging in Act 48, in cooperation with the store server 10a (Act 52). Details of the identification processing are already described above (refer to FIG. 6).

Then, the guide apparatus 30a determines whether or not an instruction for indicating the guide information for guiding the customer to the table Ti is received from the store server 10a (Act 60). If it is determined that the instruction for indicating the guide information (Yes in Act 60) is received, the guide information presentation unit 74 displays, for example, the information (for example, a path) for guiding the customer from a current position to the table Ti, on the LCD 36 (Act 62). Thereafter, the guide apparatus 30a ends the processing in FIG. 3.

On the other hand, if it is determined in Act 60 that the instruction for indicating the guide information is not received (No in Act 60), the guide apparatus 30a displays a message that the person who responds to the paging is different from the customer who is registered on the LCD 36 (Act 64). Thereafter, the guide apparatus 30a ends the processing in FIG. 9.

Next, a flow of a processing performed by the portable terminal 50 is described. The portable terminal 50 receives a paging message (message transmission) from the guide apparatus 30a, and indicates the received message, as paging information, to the portable terminal 50 (Act 50). Thereafter, the portable terminal 50 ends the processing in FIG. 9.

Subsequently, a processing performed by the store server 10a is described. First, the store server 10a performs the registration processing described above in cooperation with the guide apparatus 30a (Act 40).

Next, the table state detection unit 61 of the store server 10a performs the table state determination processing that detects the table Ti to which the customer who waits for his or her turn and the persons accompanied by the customer can be guided (Act 42). Details of the table state determination processing are as described above (refer to FIG. 8).

Subsequently, the table state detection unit 61 receives a result of the determination by the table state determination processing to determine whether or not the table Ti (unoccupied table) to which the customer is to be guided is available (Act 44). If it is determined that the table Ti to which the customer is to be guided is available (Yes in Act 44), a proceeding Act 46 is executed. On the other hand, if it is determined that the table Ti to which the customer can be guided is unavailable (No in Act 44), returning to the processing in Act 42, the table state determination processing is repeated.

If the table Ti to which the customer can be guided is found, the customer paging unit 62 instructs the guide apparatus 30a to page the customer who waits for his or her turn (Act 46). Specifically, the paging instruction by the customer paging unit 62 is transferred to the guide apparatus 30a through the communication control units 66 and 75.

Subsequently, the store server 10a performs the identification processing described above in cooperation with the guide apparatus 30a (Act 52).

The customer identification unit 63 receives a result of the determination with the identification processing, and determines whether or not the person who responds to the paging is the customer who has to be paged (Act 54). If it is determined that the person who responds to the paging is the customer who has to be paged (Yes in Act 54), the table guide unit 65 instructs the guide apparatus 30a to indicate the information for guiding the person who responds to the paging to the table (Act 56). Thereafter, the store server 10a ends the processing in FIG. 9.

On the other hand, if it is determined in Act 54 that the person who responds to the paging is not the customer who has to be paged (No in Act 54), the table guide unit 65 instructs the guide apparatus 30a to display the message that the person who responds to the paging is different from the customer who is registered (Act 58). Thereafter, the store server 10*a* ends the processing in FIG. 9.

Description of Modification of Embodiment

An in-store guide system 1*b* in the modification is the same as the in-store guide system 1*a* of the present embodiment in terms of an entire arrangement and function of each unit (refer to FIG. 1), but is different from that of the present embodiment in terms of information used at the time the registration processing and the identification processing described above are executed. For this reason, the in-store guide system 1*b* includes a store server 10*b* and a guide apparatus 30*b* instead of the store server 10*a* and the guide apparatus 30*a* described above, respectively. In the following description, an apparatus that has the same constitution as that of the in-store guide system 1*a* is given the same reference numerals as used in the preceding description.

Description of Hardware Constitution of Store Server and Guide Apparatus

Figure 10:
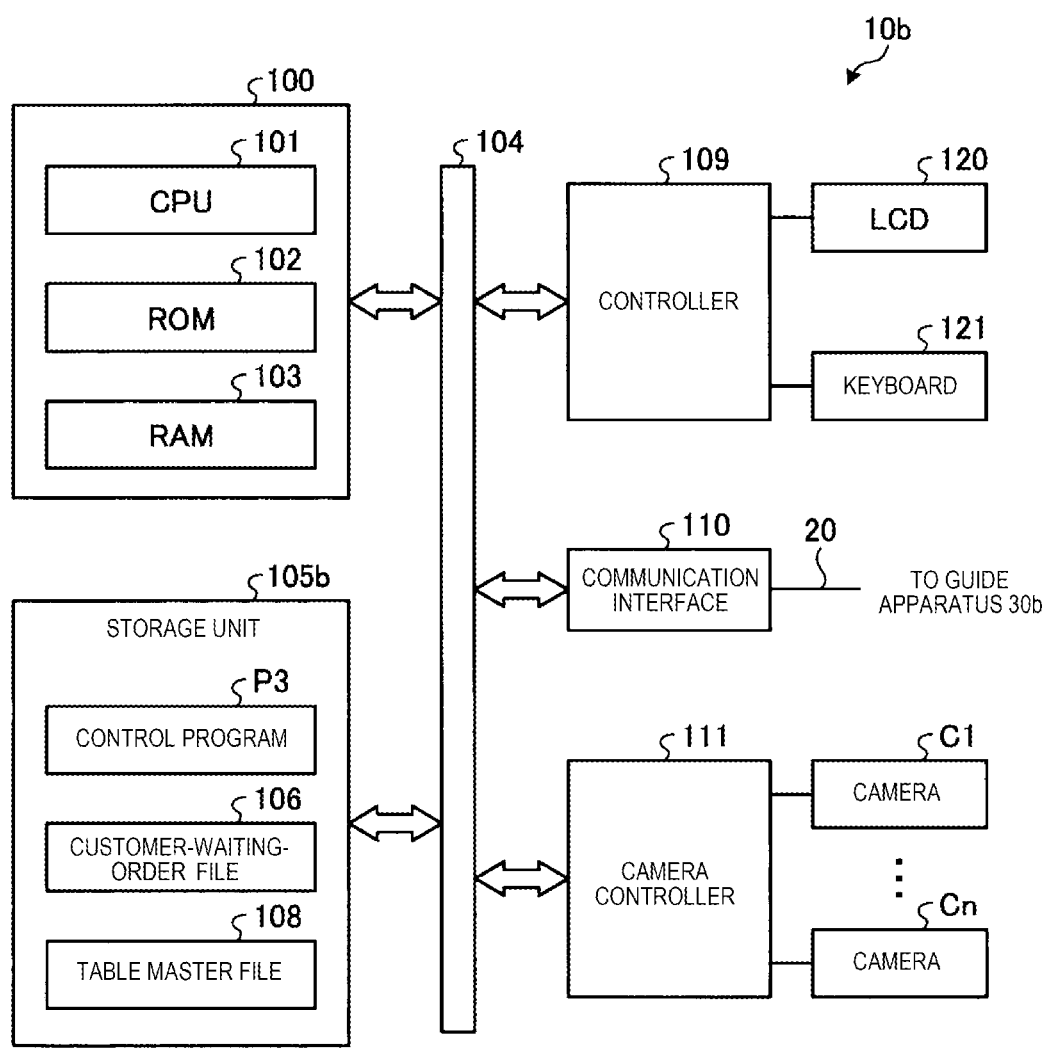
FIG. 10 is a block diagram illustrating an example of a hardware constitution of a store server in a modification of an embodiment.

FIG. 10 is a block diagram illustrating an example of the hardware constitution of the store server 10*b* in the modification.

In contrast to the store server 10*a*, the store server 10*b* includes a storage unit 105*b* instead of the storage unit 105*a*. The storage unit 105*b* stores a control program P3, the customer-waiting-order file 106, and table master file 108.

Figure 11:
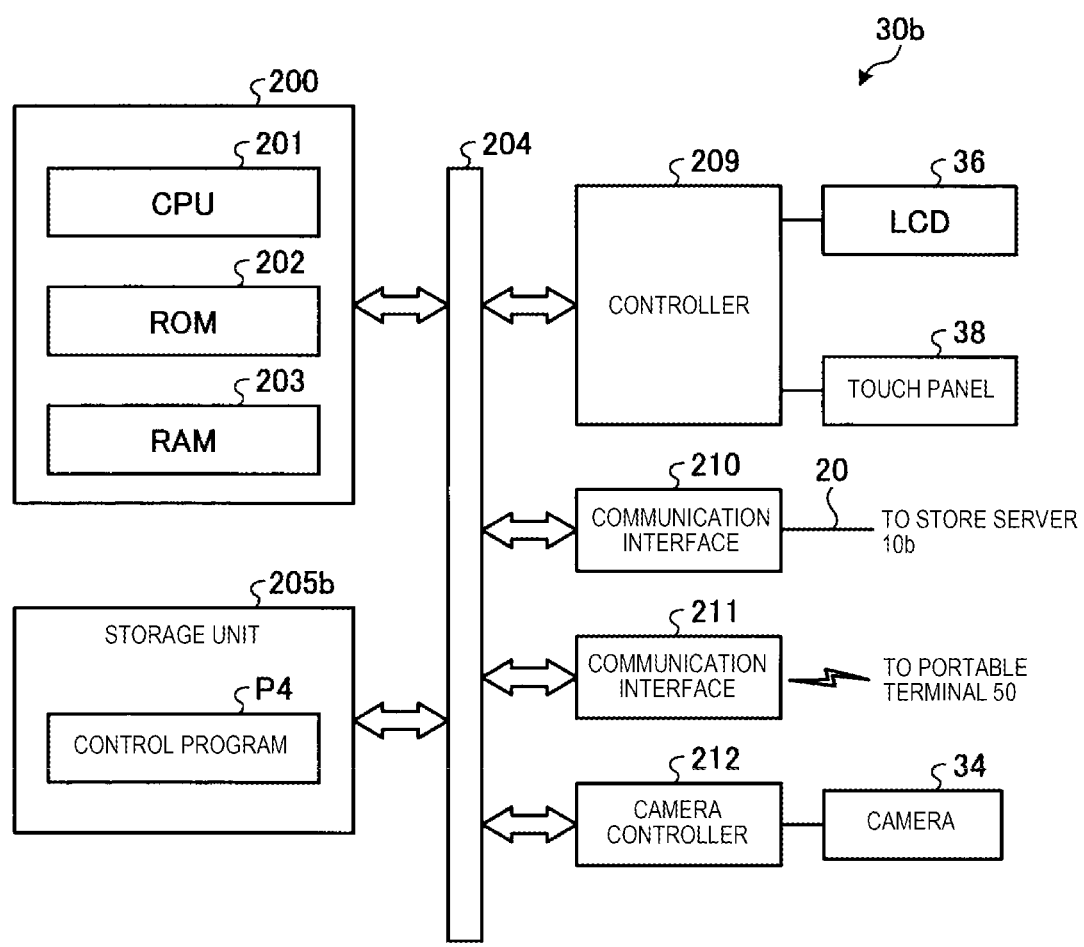
FIG. 11 is a block diagram illustrating an example of a hardware constitution of a guide apparatus in the modification of the embodiment.

Next, a hardware constitution of the guide apparatus 30*b* included in the in-store guide system 1*b* is described below with reference to FIG. 11. FIG. 11 is a block diagram illustrating an example of the constitution of the guide apparatus 30*b* in the modification.

In contrast to the guide, apparatus 30*a*, the guide apparatus 30*b* includes a storage unit 205*b* instead of the storage unit 205*a*. The storage unit 205*b* stores a program P4.

Description of Functional Constitution of In-Store Guide System

Figure 12:
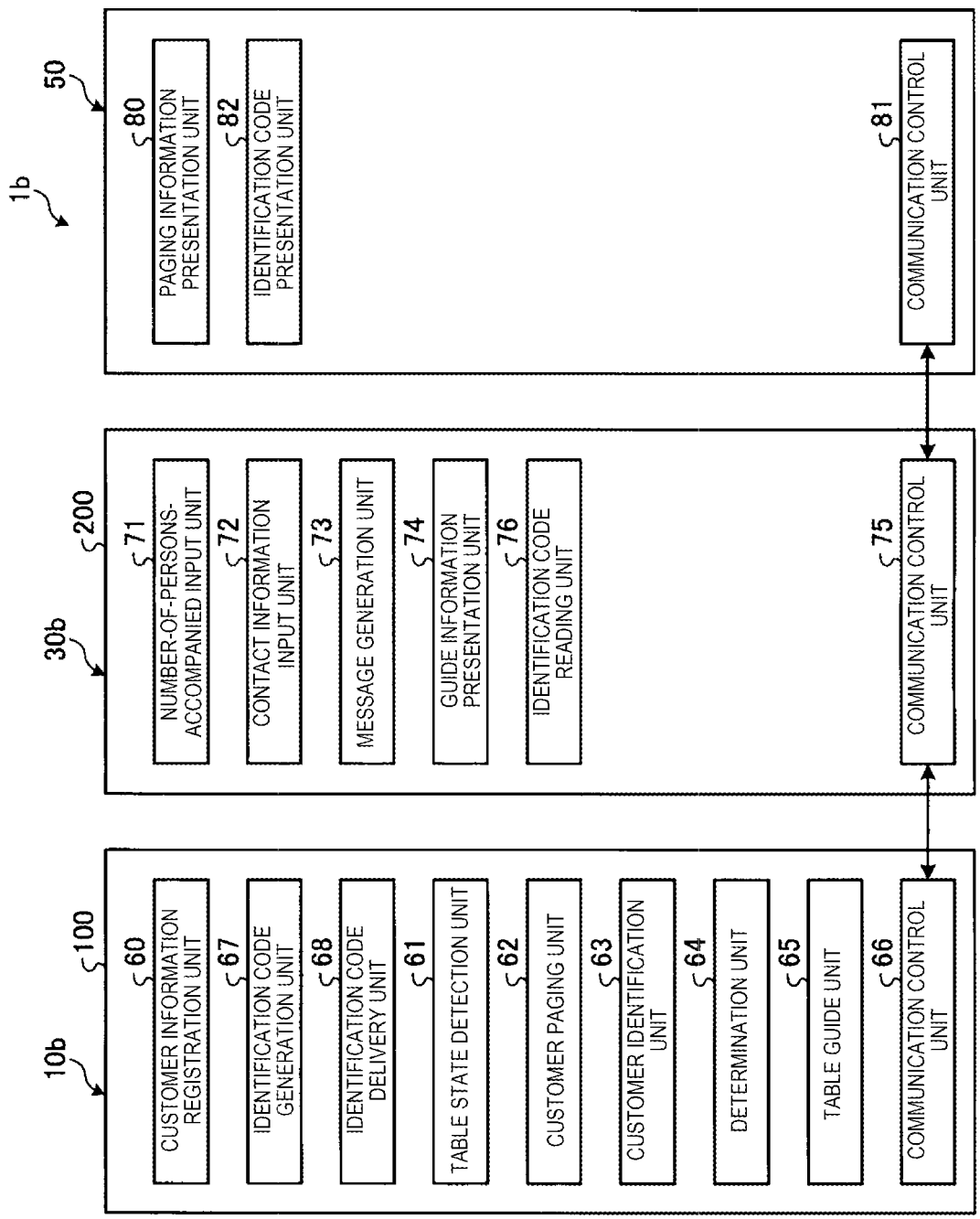
FIG. 12 is a block diagram illustrating an example of a functional constitution of an in-store guide system in the modification of the embodiment.

FIG. 12 is a block diagram illustrating an example of the functional constitution of the in-store guide system 1*b*. The control unit 100 of the store server 10*b* loads or copies the control program P3 (refer to FIG. 10) on the RAM 103 to execute the control program P3. Thus, the control unit 100 realizes each functional unit shown in FIG. 12. The control unit 100 operates as the customer information registration unit 60, the table state detection unit 61, the customer paging unit 62, the customer identification unit 63, the determination unit 64, the table guide unit 65, the communication control unit 66, an identification code generation unit 67, and an identification code delivery unit 68.

In contrast to the control unit 100 of the store server 10*a*, the control unit 100 of the store server 10*b* further includes the identification code generation unit 67 and the identification code delivery unit 68. The identification code generation unit 67 generates an identification code for specifying a person who answers to the paging. The identification code, for example, is a code information such as a barcode or a QR code (registered trademark). It is noted that the identification code generation unit 67 is an example of a generation module.

If the customer's waiting order comes, the identification code delivery unit 68 transmits the identification code from the guide apparatus 30*b* to the portable terminal 50 of the customer. The identification code delivery unit 68 is an example of a delivery module.

In contrast, to the control unit 200 of the guide apparatus 30*a*, the control unit 200 of the guide apparatus 30*b* includes an identification code reading unit 76 instead of the face image capture unit 70. The identification code reading unit 76 reads the identification code presented by the person who responds to the paging.

In contrast to the portable terminal 50 included in the in-store guide system 1*a*, the portable terminal 50 included in the in-store guide system 1*b* further includes an identification code presentation unit 82. The identification code presentation unit 82 displays the identification code transmitted from the guide apparatus 30*b* on the portable terminal 50.

In the in-store guide system 1*a*, the face image for identifying the customer who waits for his or her turn is registered in the store server 10*a*, as the first information, and then the face image of the person who responds to the paging is read by the guide apparatus 30*a*, as the second information. Then, it is determined whether or not the person who responds to the paging is the proper customer, depending on whether the first information and the second information are consistent with each other. Information of the same type as described above is used as the first information and the second information.

In contrast, in the in-store guide system 1*b*, the store server 10*b* registers the contact information (for example, mail address of the portable terminal 50) for identifying the customer as the first information at the time the customer who waits for his or her turn is registered. Then, the identification code generation unit 67 of the store server 10*b* generates the identification code uniquely assigned to the contact information of the customer who is registered, as the second information. If his or her waiting turn comes, the identification code delivery unit 68 transmits the identification code serving as the second information from the guide apparatus 30*b* to the portable terminal 50 of the customer. Then, the guide apparatus 30*b* reads the identification code presented by the person who responds to the paging. Then, the store server 10*b* determines that the person who responds to the paging is the proper customer on condition that the identification code read by the guide apparatus 30*b* is the proper identification code corresponding to the person who is paged. That is, the in-store guide system 1*b* uses information of different type, as the first information and the second information.

In the in-store guide system 1*b*, instead of the identification code read with the camera 34, the identification code generation unit 67 may generate, as the identification code, a passcode that including numbers and letters generated randomly and the customer inputs the passcode transmitted to the portable terminal 50 of the customer, through the touch panel 38.

Description of Flow of Registration Processing

Figure 13:
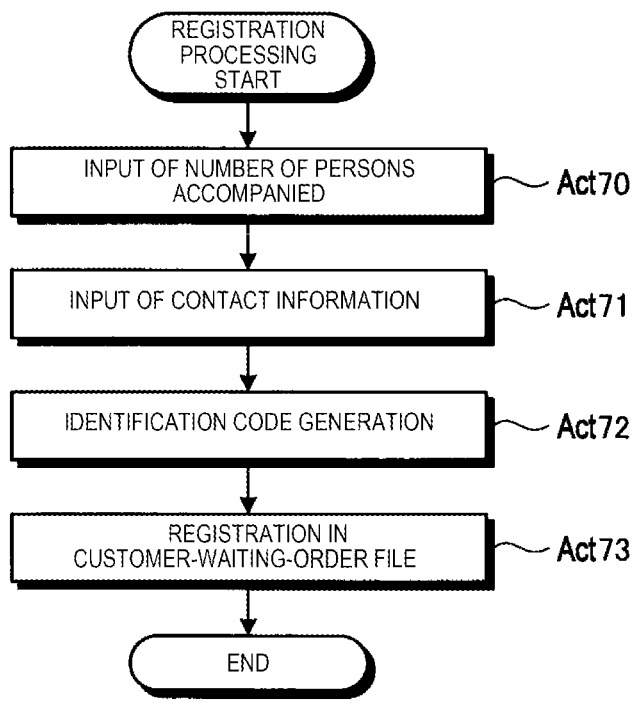
FIG. 13 is a flowchart illustrating an example of a registration processing performed by the in-store guide system in the modification of the embodiment.

FIG. 13 is a flowchart illustrating an example of the flow of the registration processing performed by the in-store guide system 1*b*.

The customer information registration unit 60 receives the number of persons accompanied by the customer through the number-of-accompanying-persons input unit 71 (Act 70).

The customer information registration unit 60 receives, through the contact information input unit 72, the contact information (for example, mail address of the portable terminal 50) to which the message is transmitted if his or her turn for paging comes (Act 71).

The identification code generation unit 67 generates the identification code corresponding to the customer registered with the customer information registration unit 60 (Act 72). The generated identification code is stored in the store server 10*b* and the guide apparatus 30*b*.

The customer in formation registration unit 60 registers the number of persons accompanied by the customer, the contact information, and the identification code in the customer-waiting-order file 106 (Act 73). Thereafter, the customer information registration unit 60 terminates the registration processing.

Description of Flow of Identification Processing

Figure 14:
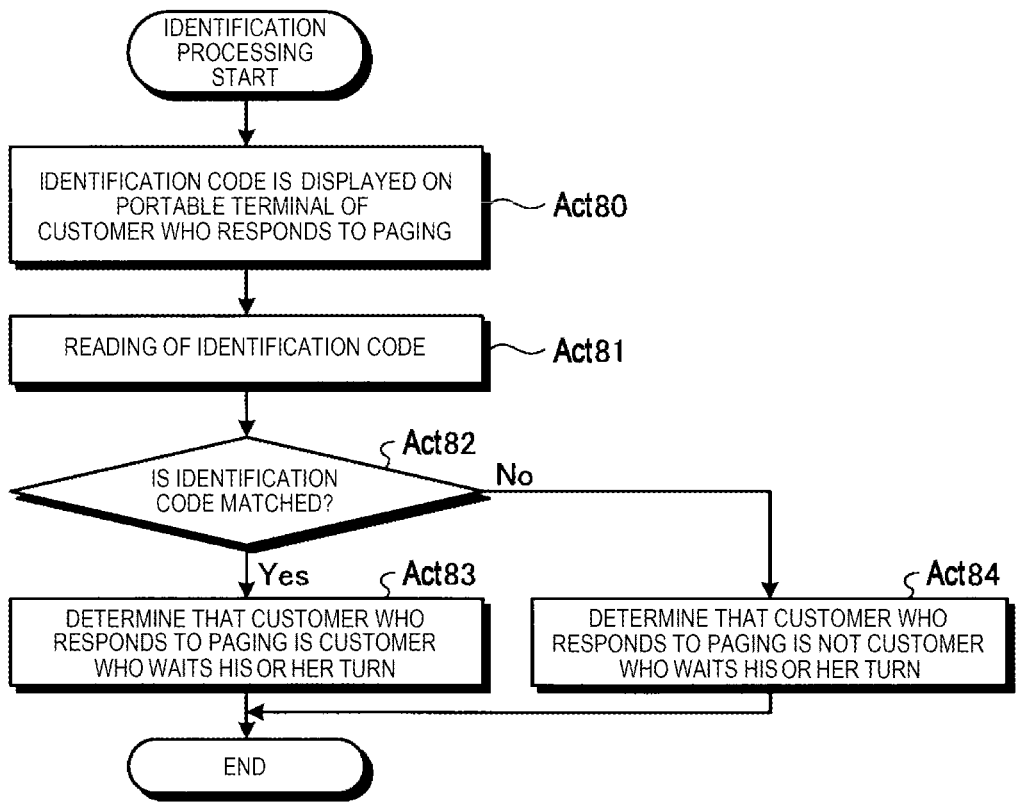
FIG. 14 is a flowchart illustrating an example of an identification processing performed by the in-store guide system in the modification of the embodiment.

FIG. 14 is a flowchart illustrating an example of the flow of the identification processing performed by the in-store guidance system 1b.

The customer identification unit 63 instructs the guide apparatus 30b to request the person who responds to the paging to display the transmitted identification code on the portable terminal 50 (Act 80). Specifically, the customer identification unit 63 displays a message for requesting the display of the identification code on the portable terminal 50 on the LCD 36 of the guide apparatus 30b.

The customer identification unit 63 instructs the identification code reading unit 76 to read the identification code of the person who responds to the paging (Act 81). Specifically, the customer identification unit 63 displays a message for requesting that the portable terminal 50 on which the identification code is displayed is held over the camera 34, on the LCD 36 of the guide apparatus 30b. The camera 34 repeatedly executes an identification processing for confirming whether the identification code is captured in images, while performing an operation for capturing images of the identification code on the portable terminal, successively. Then, if it is confirmed that the identification code is captured, the camera 34 stops the image capture operation. It is noted that an application software for reading code information by a camera which photographs a barcode or a QR code (registered trademark) is generally widely used and thus the detail of the processing described above is omitted.

Subsequently, the determination unit 64 determines whether or not the identification code read by the identification code reading unit 76 and the identification code corresponding to the person who is paged are consistent with each other (Act 82).

If it is determined that the identification code of the customer who is registered and the identification code of the person who is paged are consistent with each other (Yes in Act 82), the determination unit 64 determines that the person who is paged is the customer who waits for his or her turn (Act 83). Thereafter, the determination unit 64 terminates the identification processing.

If it is determined that the identification code of the customer who is registered and the identification code of the person who is paged are inconsistent with each other (No in Act 82), the determination unit 64 determines that the person who is paged is not the customer who waits for his or her turn (Act 84). Thereafter, the identification processing is ended.

Description of Flow for Processing Performed by In-Store Guide System

Figure 15:
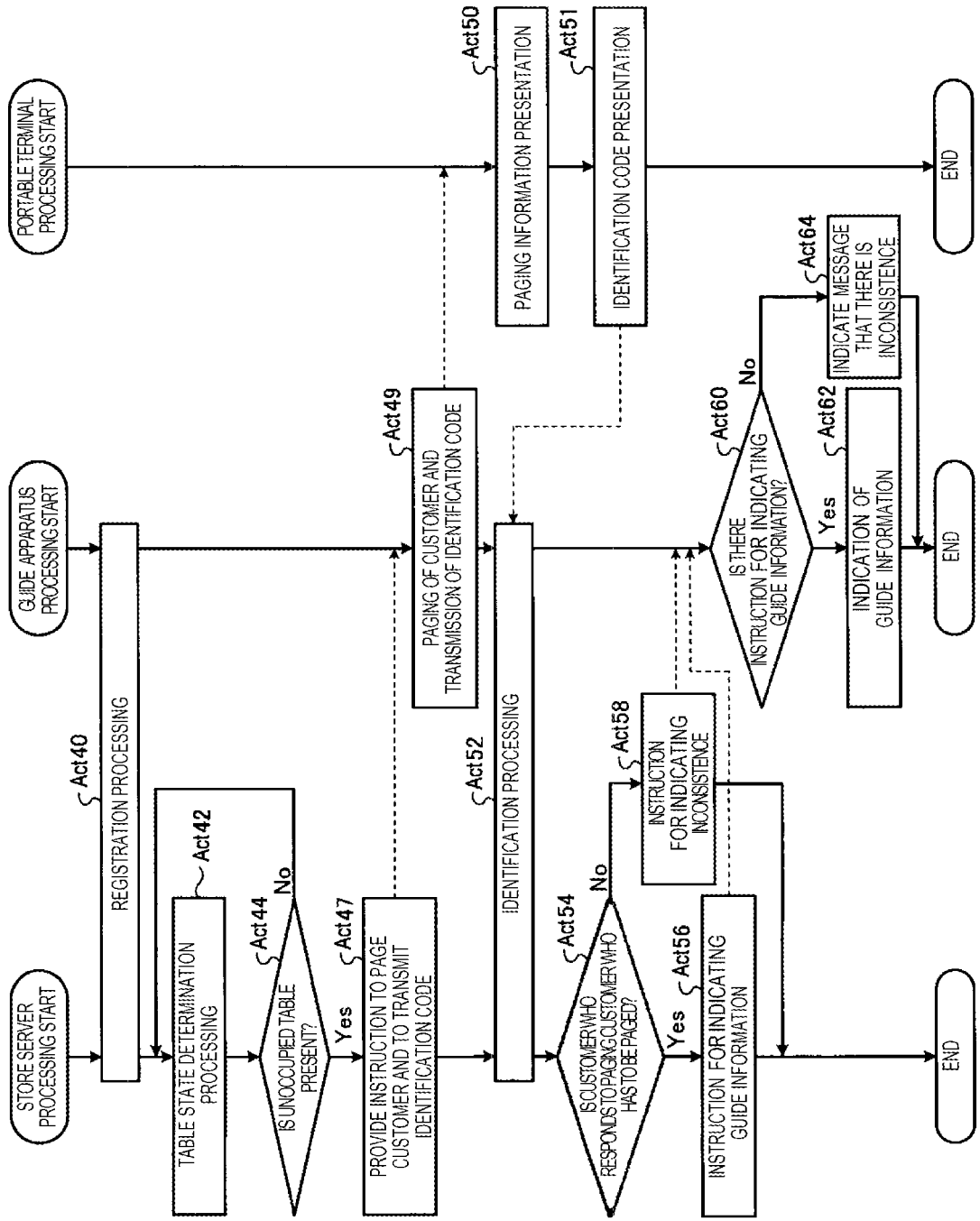
FIG. 15 is a flowchart illustrating an example of a processing performed by the in-store guide system in the modification of the embodiment.

FIG. 15 is a flowchart illustrating an example of the flow of the processing performed by the in-store guide system 1b.

The flow of the processing performed by the in-store guidance system 1b is almost the same as that (refer to FIG. 9) performed by the in-store guide system 1a and thus the differences therebetween are described.

First, a flow of processing performed by the guide apparatus 30b is described. The guide apparatus 30b performs the registration processing (Act 40) in cooperation with the store server 10b. Then, the message generation unit 73 of the guide apparatus 30b receives an instruction for paging the customer and an instruction for transmitting the identification code (Act 47) from the store server 10b and then transmits a message for paging the customer and the identification code to the portable terminal 50 of the customer (Act 49).

Next, the guide apparatus 30b requests the person who responds to the paging in Act 49 to present the transmitted identification code, and, in cooperation with the store server 10b, performs the identification processing for confirming whether or not the person who responds to the paging is actually the customer who has to be paged (Act 52). It is noted that details of the identification processing are described as above (refer to FIG. 14).

Subsequently, the guide apparatus 30b receives an instruction for indicating the guide information or information indicating an inconsistency of customer from the store server 10b, and performs an information presentation to the person who responds to the paging (Acts 60, 62, and 64). A flow of the processing including these Acts is the same as that in FIG. 9.

Next, a flow of processing performed by the portable terminal 50 is described. The portable terminal 50 receives the paging message from the guide apparatus 30b, and displays the received message on the screen of the portable terminal 50 (Act 50). Thereafter, the portable terminal 50 further displays the identification code transmitted from the guide apparatus 30b (Act 51). The identification code may be automatically displayed just after the display of the paging information or may be displayed by requesting the customer to operate a shortcut key such as an icon attached to the paging information. Then, after the processing in Act 51, the portable terminal 50 ends the processing in FIG. 15.

A processing performed by the store server 10b is described. The registration processing (Act 40), the table state determination processing (Act 42), and the determination of whether or not there is a table Ti (unoccupied table) to which a customer can be guided (Act 44) are described as above in FIG. 9.

Subsequently, the customer paging unit 62 of the store server 10b instructs the guide apparatus 30b to page the customer who waits for his or her turn. Along with this, the identification code delivery unit 68 instructs the guide apparatus 30b to transmit the identification code to the portable terminal 50 of the customer whose turn to be paged comes (Act 47).

Then, the store, server 10b performs each of the identification processing (Act 52), the reception of the result of the determination with the identification processing and the determination of whether or not the person is the customer who has to be paged based on the result of the determination (Step 54), and the instruction for presenting the guide information based on the result of the determination (Act 56) or the instruct ion for displaying the message that the person who responds to the paging is not a person who is registered (Act 58). The processing including these Acts is already described as above with reference to FIG. 9.

As described above, according to the store server 10a (server apparatus) of the present embodiment, the customer who comes to the store registers information including his or her face image (first information) for identifying the customer, with the customer information registration unit 60 (registration module) if the customer registers his or her turn on the waiting list. Then, if his or her turn comes, the customer paging unit 62 (paging module) performs notification for paging the customer. Next, the customer identification unit 63 (identification module) confirms information, i.e., the face image of the person who responds to the paging (second information), which relates to the first information. Then, based on the result of the confirmation by the customer identification unit 53, the determination unit 64 determines whether or not the person who responds to the paging is really a person who has to be paged. In the present embodiment described above, the person who responds to the paging is determined as whether or not he or she is a person who waits for his or her turn based on the first information registered with the registration unit and the second information relating to the first information. Therefore, it can prevent a third person perform from impersonating.

Furthermore, according to the store server 10*a*, the customer identification unit 63 confirms whether or not the second information (face image) acquired from the customer who is paged by the customer paging unit 62 is identical with or similar to the first information (face image). Therefore, it can be reliably confirmed whether or not the person who responds to the paging is the customer who is paged by the paging unit. Particularly, by using biological information, such as a face image, which is specific to the customer, the identity fraud by a third person can be reliably prevented.

According to the store server 10*a* of the present embodiment, the table state detection unit 61 (detection module) detects the table to which the customer who waits for his or her turn and the persons accompanied by the customer can be guided, and the customer paging unit 62 (paging module) pages the customer who waits for his or her turn on condition that the table state detection unit 61 detects the table to which the customer who waits for his or her turn and the persons accompanied by the customer can be guided. Therefore, the paging is performed automatically, and thus workload of employees in the store can be reduced.

According to the store server 10*a* of the present embodiment, the table state detection unit 61 (table state determination module) compares the reference image I1 (first image), including at least the table Ti, which is captured by one of the cameras C1 to Cn (imaging module) at the rime the table Ti is in the state in which a customer can be guided, and the current image I2 (second image), including at least the table Ti, which is captured by one of the cameras C1 to Cn, to determine whether or not the table Ti is in the state in which a customer can be guided. Therefore, it can be reliably detected that the table Ti is in the state in which a customer can be guided.

Furthermore, according to the store server 10*b* of the present embodiment, the identification code generation unit 67 (generation module) generates the identification code as the second information corresponding to the first information at the time the contact information for identifying the customer is registered as the first information. Then, the identification code delivery unit 68 (delivery module) transmits (delivers) the identification code to the portable terminal 50 (information processing apparatus) carried with the customer carries if his or her turn for paging comes. Then, the customer identification unit 63 reads the identification code from the portable terminal 50 of the customer who responds to the paging to confirm whether or not the person who responds to the paging is consistent with the customer who is paged. The consistency between the person who responds to the paging and the customer who has to be paged is determined based on the first information registered with the registration module and the second information relating to the first information, and thus the identity fraud by a third person can be prevented.

For example, the control program P1 executed by the store server 10*a* and the control program P2 executed by the guide apparatus 30*a* may be provided in a state in which they are stored in advance in the storage units 105*a* and 205*a*, respectively, or in which they are recorded in the installable tile format or in the executable file format in a computer-readable recording medium such as a CD-ROM, a flexible disk (FD), a CD-R, or a digital versatile disk (DVD). Furthermore, the control programs P1 and P2 may also be provided in a state in which they are stored on a computer connected to a network, or may be provided by being downloaded over the network. Additionally, the control programs P1 and P2 may be provided or distributed over the network such as the Internet.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An apparatus comprising:
    a registration module configured to register first information including an identifiable characteristic in a first image for identifying a customer who waits for the customer's turn;
    a paging module configured to notify, upon a determination that the customer's turn has come, the customer based on the first information registered with the registration module;
    an identification module configured to:
        receive second information including a corresponding identifiable characteristic in a second image for identifying a person who responds to paging by the paging module, and
        calculate a degree of similarity between the identifiable characteristic and the corresponding identifiable characteristic; and
    a determination module configured to determine whether or not the person who responds to the paging is really the customer who has to be paged, based on the degree of similarity calculated by the identification module.

2. The apparatus according to claim 1, wherein the identification module confirms whether or not the second information acquired from the person who is paged by the paging module is the same as the first information.

3. The apparatus according to claim 1, further comprising:
    a generation module configured to generate the second information corresponding to the first information at the time the first information is registered; and
    a delivery module configured to deliver the second information to an information processing device carried by the customer who waits for the customer's turn.

4. The apparatus according to claim 1, further comprising:
    a detection module configured to detect a table to which the customer who waits for the customer's turn and persons accompanied by the customer can be guided,
    wherein the paging module performs the notification for paging the customer who waits for the customer's turn on condition that the detection module detects the table to which the customer can be guided.

5. The apparatus according to claim 4, wherein the detection module includes
    an image capture module configured to capture an image including at least the table, and a table state determination module configured to compare a first image captured by the image capture module which photographs the table in a state in which the customer can be guided thereto and a second image captured by the image capture module, and to determine whether or not the table is in the state in which the customer can be guided thereto.

6. A method for verifying a customer who waits for the customer's turn when the customer's turn has come, the method comprising:

receiving first information including an identifiable characteristic in a first image for identifying the customer who waits for the customer's turn;

notifying the customer based on the first information when the customer's turn has come;

receiving second information including a corresponding identifiable characteristic in a second image for identifying a person who responded to the notification;

calculating a degree of similarity between the identifiable characteristic and the corresponding identifiable characteristic;

determining whether the second information matches the first information based on the degree of similarity; and upon determining that the person who has responded to the notification is the customer, providing guide information.

7. The method of claim 6, wherein notifying the customer includes sending a paging signal to the customer.

8. The method of claim 6, wherein the first image includes an image of the customer's face and the second image includes an image of the person's face.

9. The method of claim 6, further comprising, upon determining that the person who has responded to the notification is not the customer, denying further guide information to the person responded to the notification.

10. The method of claim 6, further comprising, before notifying the customer, determining the customer's turn has come, wherein the determination comprises:

comparing a captured current image of a table to a reference image; and determining an available state of a table for serving the next customer.

11. The method of claim 10, wherein comparing a captured current image of a table to a reference image comprises capturing a current image of every table.

12. The method of claim 11, wherein determining the customer's turn comprises determining a number of available seats of a table matching a number of persons accompanied provided by the customer.

13. A system for verifying wait-listed customers, the system comprising a computer server monitoring at least one camera, and a guide apparatus having one or more input devices for registering information of the wait-listed customers, wherein the computer server is configured to determine an availability of a table, notify a next customer in turn, and verify that a person claiming to be the next customer is in fact the next customer as registered by:

identifying a first identifiable characteristic of the customer;

identifying a corresponding identifiable characteristic of the person;

calculating a degree of similarity between the first identifiable characteristic and the corresponding characteristic; and determining whether the person and is the next customer based on the degree of similarity.

14. The system of claim 13, wherein the guide apparatus receives input from a customer, the input includes an image of the customer's face, contact information, and a number of the customer's party group.

15. The system of claim 14, wherein the computer server comprises a table state detection unit for identifying tables that have the capacity to serve the number of the customer's party group.

16. The system of claim 14, wherein the computer server comprises a customer paging unit for notifying the customer based on the registered contact information.

17. The system of claim 14, wherein the computer server comprises a determination unit for comparing a second image of a face of the person claiming to be the next customer and the image of the customer's face, and upon verification, the determination unit enables a communication control unit of the computer server to provide guide information at the guide apparatus.

18. The system of claim 14, wherein the provided contact information includes a number for reaching the customer's portable terminal.

19. The system of claim 13, wherein the at least one camera is placed at a ceiling pointing downward toward one or more tables.

20. The system of claim 13, wherein the guide apparatus includes a keyboard and a camera for accepting information of the wait-listed customers.

* * * * *